UNITED STATES PATENT OFFICE.

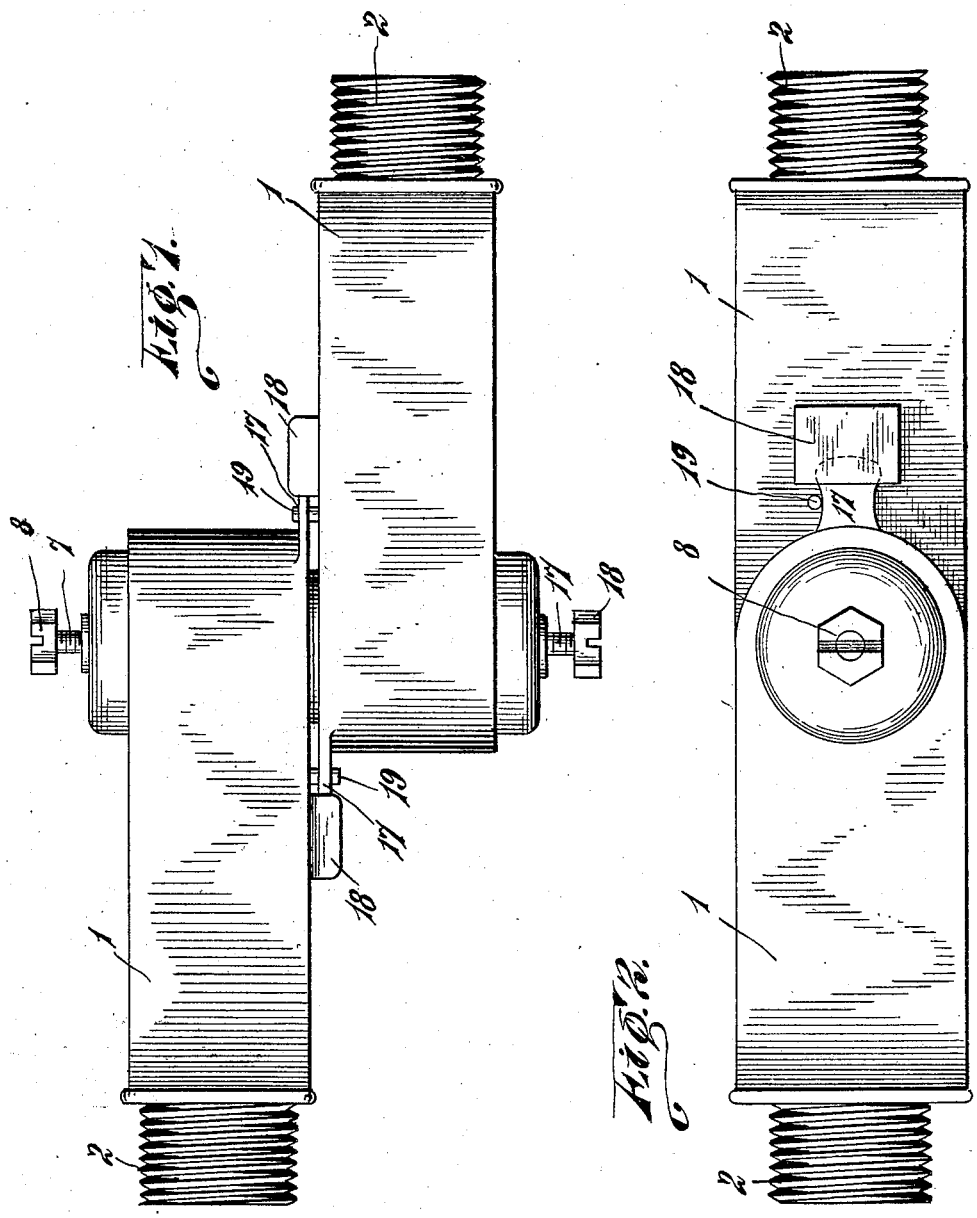

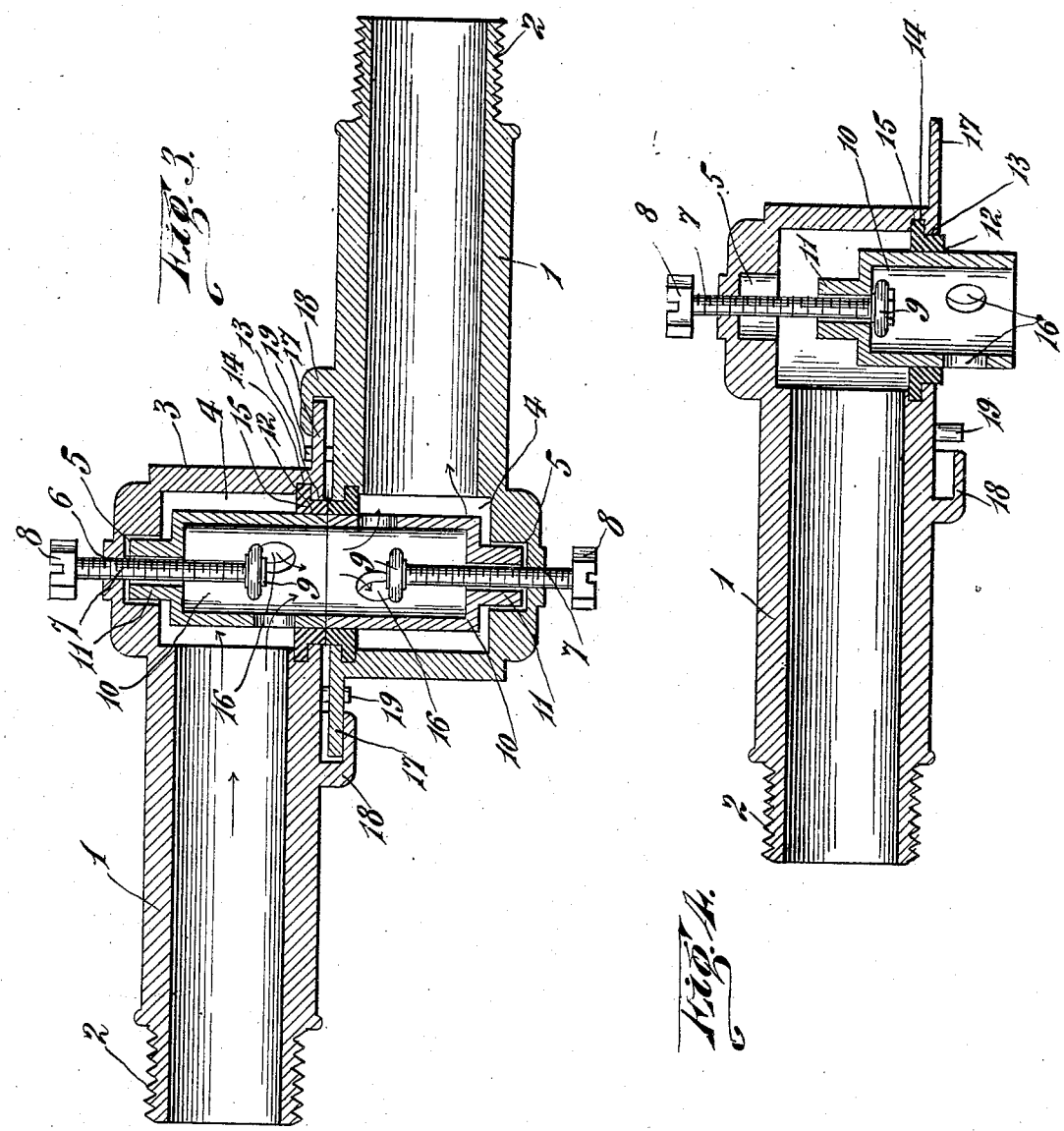

JOSEPH EUSÈBE LA ROCQUE, OF NOMININQUE, QUEBEC, CANADA.

AIR-BRAKE HOSE-COUPLING.

No. 883,814.   Specification of Letters Patent.   Patented April 7, 1908.

Application filed July 24, 1907. Serial No. 385,302.

*To all whom it may concern:*

Be it known that I, JOSEPH EUSÈBE LA ROCQUE, a subject of the King of Great Britain, residing at Nomininque, county of Ottawa, in the Province of Quebec, Canada, have invented certain new and useful Improvements in Air-Brake Hose-Couplings; and I do hereby declare that the following is a full, clear, and exact description of the invention, such as will enable others skilled in the art to which it appertains to make and use the same.

My invention relates to air brake hose-couplings.

The object of my invention is to provide a hose-coupling in which the valve may be adjusted from the outside of the coupling head.

A further more general object is to provide a simple and easily operated construction.

My invention consists of the construction, combination and arrangement of parts, as herein illustrated, described, and claimed.

In the accompanying drawings, forming part of this application, I have illustrated one form of embodiment of my invention, in which drawings similar reference characters designate corresponding parts, and in which:

Figure 1 is a side elevation of two coupling members joined together; Fig. 2 is a plan view of two coupling members joined; Fig. 3 is a longitudinal section taken approximately centrally of Fig. 2; and, Fig. 4 is a longitudinal vertical section taken through one coupling member showing the valve in its closed position.

Referring to the drawings, 1 designates a hollow section provided with screwthreads 2 adapted to be engaged with any common form of flexible air brake hose. The hollow section 1 is provided with an enlarged end 3 having therein a chamber 4. In one wall of the chamber 4 there is formed a recess 5 and through the wall communicating with the recess there is formed an interiorly screwthreaded bore 6. Disposed in the screwthreaded bore 6 is an exteriorly screwthreaded valve stem 7 provided with a slotted head 8 at its outer end, so that it may be adjusted into the chamber from the outside. Disposed on the inner end of the screwthreaded stem 7 is a retaining button 9.

Slidably disposed on the screwthreaded stem 7 is a hollow valve 10 provided with a neck 11 adapted to lie within the recess 5 when the valve is in open position.

The wall of the chamber 4 opposite to the screwthreaded bore 6 is provided with a bore 12 into which projects a flange 13, leaving an annular recess 14, which recess and flange are adapted to receive a compressible gasket 15. The valve 10 works through the bore 12 and the gasket 15 forms an air tight joint around the outer wall of the valve. The vertical wall of the valve 10 is provided with openings 16 which permit the ready passage of air in the direction indicated by the arrows when the open end of the valve lies flush with the face of the hollow section 1. When the valve is in the position shown in Fig. 4 the openings 10 lie beyond the plane of the wall of the section 1 and the air is not permitted to escape.

In use two of the couplings described are used to make a joint and each section 1 is provided with a lip 17 adapted to engage under a corresponding flange 18 carried by each section, and also adapted to have its movement axially limited by means of a pin 19 carried in the section 1.

In the operation of the invention two of the sections 1 and the connected parts are carried by adjacent ends of railway cars. When secured together as shown in Fig. 3 the air, or other medium for operating the brakes, is permitted to pass freely between the sections 1 along the lines indicated by the arrows in Fig. 3. If it is desired to cut off a car, the valve attached to the car to be cut off is adjusted as shown in Figs. 3 and 4. The valve attached to the rear end of the forward part of the train is adjusted by actuating the screwthreaded stem 7 so that the valve 10 will move to the position shown in Fig. 4, and so keep the brake on the forward section inoperative. The valve in the forward end of the cut off section will be adjusted to allow the slow escape of air in its brake system and the brakes in this section will, as a result, be instantly set as the car is cut off.

It will be noted that no springs are used to actuate the valve 10 to the position shown in Fig. 4, as the chamber 4 is enlarged and the upper end of the valve 10 is reduced so that there is an adjacent outward and downward pressure on the valve so that it automatically closes without the aid of a spring. The degree of the closing of the valve may be regulated from the outside by turning the slotted head 8, as the movement of the valve cannot be beyond the button 9.

Having thus fully described my invention, what I claim as new and desire to secure by Letters Patent is:

An air brake hose coupling comprising a hollow member having an enlarged chamber provided with a bore through one wall and a screwthreaded bore through its opposite wall, a screwthreaded stem disposed through said screwthreaded bore, a perforated cylindrical valve slidably mounted on said stem and adapted to be moved to establish communication between the air brake pipe and the outer atmosphere and a button on the inner end of said rod adapted to limit the movement of said valve to provide for a slow escape of air from the train pipe through said valve to thereby set the brakes.

In witness whereof I have hereunto set my hand in the presence of two witnesses.

JOSEPH EUSÈBE LA ROCQUE.

Witnesses:
F. MYNARD,
E. WRIGHT.